United States Patent
Torrachi et al.

(10) Patent No.: US 9,351,565 B2
(45) Date of Patent: May 31, 2016

(54) CLAMP FOR MOUNTING OF TRAY AND TRAY ASSEMBLY THEREOF

(71) Applicant: ERGINNOV, Ajaccio (FR)

(72) Inventors: Frederic Torrachi, Ajaccio (FR); Paul Conil, Peri (FR)

(73) Assignee: ERGINNOV, Ajaccio (FR)

( * ) Notice: Subject to any disclaimer, the term of this patent is extended or adjusted under 35 U.S.C. 154(b) by 0 days.

(21) Appl. No.: 14/522,243

(22) Filed: Oct. 23, 2014

(65) Prior Publication Data
US 2015/0114271 A1    Apr. 30, 2015

(30) Foreign Application Priority Data

Oct. 28, 2013   (EP) ..................................... 13190558

(51) Int. Cl.
*A47B 23/02* (2006.01)
*A47B 23/04* (2006.01)
*F16M 13/02* (2006.01)
*F16B 2/06* (2006.01)
*F16B 2/10* (2006.01)
*F16B 5/06* (2006.01)

(52) U.S. Cl.
CPC .................. *A47B 23/04* (2013.01); *F16B 2/065* (2013.01); *F16B 2/10* (2013.01); *F16M 13/02* (2013.01); *F16B 5/0642* (2013.01)

(58) Field of Classification Search
CPC ...... A47B 23/02; A47B 23/025; A47B 23/04; A47B 2323/042; F16M 13/02
USPC ........................................................... 108/97
See application file for complete search history.

(56) References Cited

U.S. PATENT DOCUMENTS

| 2,028,789 | A | * | 1/1936 | Lindquist | ................ | D06F 81/06 |
| | | | | | | 108/96 |
| 3,543,312 | A | * | 12/1970 | Pofferi | .................... | A47B 23/02 |
| | | | | | | 108/49 |
| 5,205,222 | A | * | 4/1993 | Bernard | .................. | D06F 79/02 |
| | | | | | | 108/42 |
| 2006/0162625 | A1 | * | 7/2006 | Mayben | ............... | A47B 17/036 |
| | | | | | | 108/97 |
| 2007/0131149 | A1 | * | 6/2007 | Mayben | ............... | A47B 17/036 |
| | | | | | | 108/97 |
| 2008/0296334 | A1 | * | 12/2008 | Carnevali | ............ | B60R 11/0241 |
| | | | | | | 224/558 |
| 2013/0200023 | A1 | * | 8/2013 | Brotzman | .......... | A61B 19/0248 |
| | | | | | | 211/85.13 |

FOREIGN PATENT DOCUMENTS

DE   202013101181 U1   3/2013
EP       0384930 A1    9/1990

OTHER PUBLICATIONS

European Search Report (Dated March 31, 2014) on European Patent Application No. EP 13 19 0558.

* cited by examiner

*Primary Examiner* — Daniel Rohrhoff
(74) *Attorney, Agent, or Firm* — BCF LLP

(57) ABSTRACT

A clamp for mounting a tray on a platform includes a base portion, a connector element coupled to the base portion, the connector element being adapted to form a detachable joint with the tray. The clamp also includes an extension portion coupled to the base portion, the extension portion having a spacing element for adjusting a clamping width based at least on a thickness of the platform. The clamping width is a distance between the tray and an element of the clamp. The clamp can be coupled to a tray having a corresponding connector element that forms the detachable joint with the clamp, to form a tray assembly.

15 Claims, 5 Drawing Sheets

CLAMP FOR MOUNTING OF TRAY AND TRAY ASSEMBLY THEREOF

RELATED APPLICATIONS

This application claims priority to EP application no. 13190558.0, filed on Oct. 28, 2013, the entire contents of which are hereby incorporated by reference.

FIELD OF INVENTION

The present subject matter relates to assembly for mounting and, particularly but not exclusively, to clamp for mounting of tray and tray assembly thereof.

BACKGROUND

Typically, to mount trays, for example, arm rests, table extensions, keyboard holders, etc., onto platforms, such as table tops, clamps are used. A clamp is generally fixedly attached to a tray at one end and can be mounted onto a platform at another end to hold the tray in position against the platform while in use. The clamp may be designed for use with platforms having a particular thickness or may include a spring-clip arrangement for adapting the clamp to small variations in platform thicknesses. Such clamp-tray arrangements are generally used for mounting the tray for a particular purpose and may be temporarily mounted onto the platform such that the tray can be removed after use. However, typical clamp-tray arrangements tend to be bulky and take time and effort to mount and dismount.

SUMMARY

This summary is provided to introduce concepts related to clamp for mounting of tray and tray assembly thereof. This summary is not intended to identify essential features of the claimed subject matter nor is it intended for use in determining or limiting the scope of the claimed subject matter.

In one implementation, a clamp for mounting a tray on a platform includes a base portion, a connector element coupled to the base portion, the connector element being adapted to form a detachable joint with the tray, and an extension portion coupled to the base portion, the extension portion having a spacing element for adjusting a clamping width based at least on a thickness of the platform. The detachable joint can be one of a pivotable hinge joint, a sliding joint, and a groove based joint.

In another implementation, a tray assembly mountable on a platform comprises a clamp for mounting the tray on the platform. The clamp includes a base portion, an extension portion coupled to the base portion, the extension portion having a spacing element for adjusting a clamping width based at least on a thickness of the platform, and a first connector element coupled to the base portion, the first connector element being adapted to form a detachable joint with the tray. The tray assembly further comprises a tray having a second connector element to form the detachable joint. The detachable joint can be one of a pivotable hinge joint, a sliding joint, and a groove based joint.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. It should be appreciated by those skilled in the art that the diagrams herein represent views of illustrative devices embodying the principles of the present subject matter.

DESCRIPTION OF EMBODIMENTS

Figure 1A:
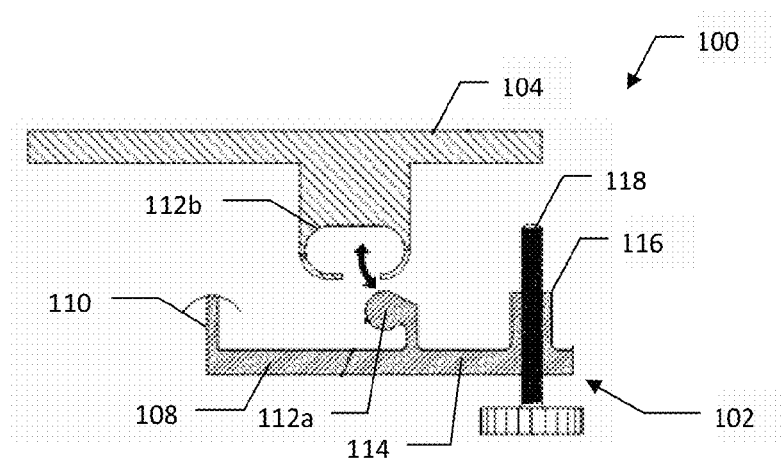
FIGS. 1a, 1b and 1c schematically illustrate various stages of assembling of a clamp with a tray to form a tray assembly, in accordance with one embodiment of the present subject matter.

Various embodiments of clamp for mounting of tray and tray assembly thereof are described. The assemblies as described herein can be used, for example, to provide an ergonomic working area in an office or in other places, such as at home or at a video games parlor. In an example, when the tray is an arm rest, the tray can be used to support the arm while working on a laptop or on other computing systems placed on a desk. The arm rest thus positioned can relieve the weight column on arms while working. In another example, the tray may be used to place a keyboard, a computer mouse, etc., in an ergonomic position. In yet another example, the tray assembly may be used as a table extension and can be mounted on a table or on the arm of a chair. The clamp and the tray assembly may also be used in other applications, for example, in the field of disability.

The clamp as described herein can be easily adapted for being mounted onto platforms of various thicknesses. In one implementation, the clamp is not fixedly connected to the tray, but can be easily and quickly connected to the tray to form the tray assembly and can also be easily disconnected from the tray when required. As a result, the tray and the clamp can be stored in a compact manner without occupying an undue amount of storage space. This also facilitates in portability of the clamp and the tray, for example, for transfer between a workplace and home.

In one embodiment, the clamp for mounting a tray on a platform includes a base portion, a connector element and an extension portion connected to the base portion. The connector element is coupled to one end of the base portion and is adapted to form a detachable joint with the tray. The detachable joint can be, for example, a pivotable hinge joint, a sliding joint, and a groove-based joint. The extension portion includes a spacing element for adjusting a clamping width based at least on a thickness of the platform. The clamping width is the distance between the tray and an element on the clamp that braces the tray against the platform and helps to hold the tray in position while in use. In one example, the clamping width can be a distance between the spacing element and the tray. In another example, the clamping width can be a distance between a supporting element and the tray.

In one implementation, the supporting element is coupled to one end of the base portion and serves to clamp the tray with the platform. In such a case, the connector element in the clamp may form a hinge with the tray. The hinge formed by the connector element acts as a pivot point and aids in connecting and disconnecting the tray to the clamp and also in adjusting the clamping width by changing the distance between the supporting element and the tray.

In one implementation, the base portion is substantially U-shaped with the supporting element formed on one end of the U-shape, the connector element formed on other end of the U-shape, and the extension portion disposed adjacent to the connector element.

Further, in one embodiment, the tray has a corresponding connector element that can be coupled to the connector element in the clamp to form the detachable joint, thereby forming the tray assembly. For this, in one implementation, one of the connector elements, either in the tray or in the clamp, can include a partially open elongated cavity accessible through a recess on a surface and the other connector element can be a protruding pin adapted to be inserted into the elongated cavity through the recess to form a pivotable hinge. In another implementation, one of the connector elements can include a groove and the other connector element can include a ridge that is slidable inside the groove. Other detachable joints, not mentioned herein, can also be formed as will be understood by a person skilled in the art.

Therefore, with the present subject matter, the tray assembly and the clamp are made portable, compact, easy to use and adaptable for use with a variety of platforms. The tray assembly and the clamp can be formed of different materials, such as wood, plastic, or metal, as will be understood by a person skilled in the art. The various features of the clamp and the tray assembly of the present subject matter will be further described below with respect to various figures.

It should be noted that the description and figures merely illustrate the principles of the present subject matter. It will thus be appreciated that those skilled in the art will be able to devise various arrangements that, although not explicitly described or shown herein, embody the principles of the present subject matter and are included within its scope. While aspects of described clamp for mounting of a tray and a tray assembly thereof can be implemented in any number of different embodiments, the embodiments are described in the context of the following exemplary implementation(s).

Figure 1B:
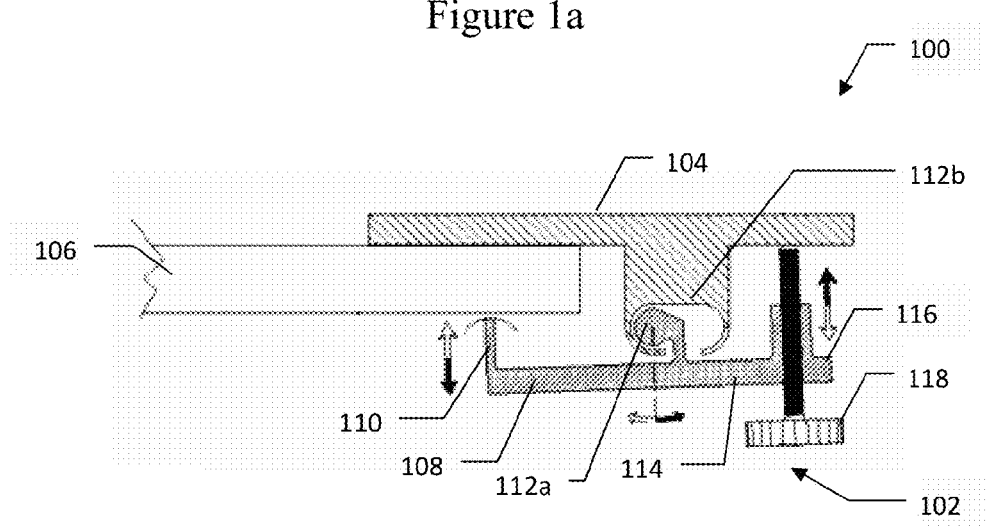
Figure 1C:
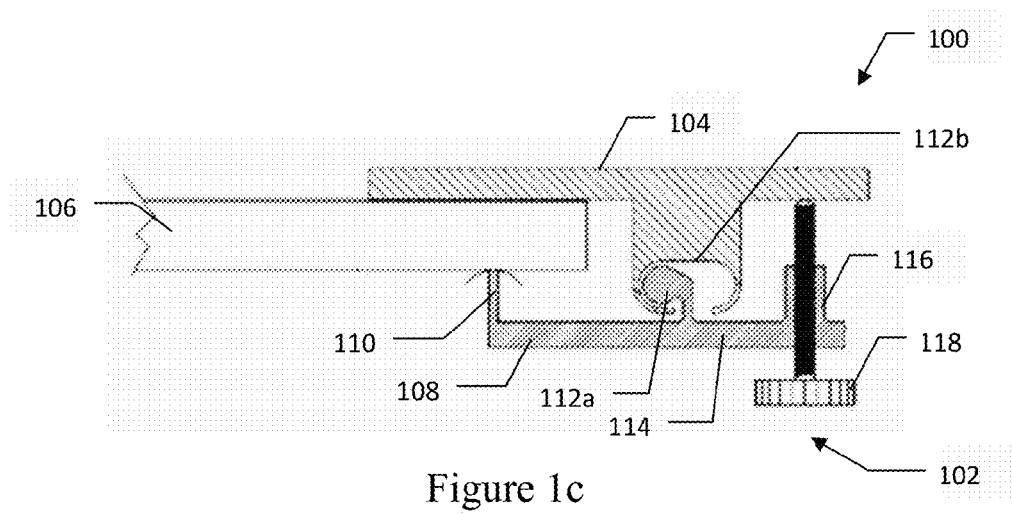

FIGS. 1a, 1b, and 1c schematically illustrate various stages of assembling of a clamp with a tray to form a tray assembly and mounting thereof onto a platform, in accordance with one embodiment of the present subject matter. As shown in the FIGS. 1a-1c, a tray assembly 100 includes a clamp 102 and a tray 104. Further, the tray assembly 100 can be mounted onto a platform 106.

The clamp 102 includes a base portion 108, a supporting element 110 coupled to the base portion 108, a first connector element 112a coupled to the base portion 108, and an extension portion 114 coupled to the base portion 108. Further, the extension portion 114 includes a spacing element 116 for adjusting a distance between the supporting element 110 and the tray 104. The tray 104 on the other hand comprises a second connector element 112b.

It will be understood that while in one embodiment the clamp 102, including the base portion 108, the supporting element 110, the first connector element 112a, the extension portion 114, and the spacing element 116, can be formed as a single unit, in other embodiments one or more parts of the clamp 102 can be formed as separate units that can be assembled together to form the clamp 102.

As is shown in the FIGS. 1a-1c, in one implementation, the first connector element 112a and the second connector element 112b are adapted to form a detachable hinge and provide a pivot point for the clamp 102 against the tray 104. In the example embodiment, the second connector element 112b is a partially open elongated cavity accessible through a recess on a surface of the second connector element 112b, while the first connector element 112a is a protruding pin that is adapted to be inserted into the elongated cavity through the recess to form the hinge. It will however be appreciated that, in other embodiments, the first connector element 112a on the clamp 102 may be a partially open elongated cavity and the second connector element 112b on the tray 104 may be a protruding pin that can be inserted into the partially open elongated cavity to form the hinge.

During assembly, the first connector element 112a and the second connector element 112b can be coupled together to form the hinge. Further, as shown in FIG. 1b, the tray assembly 100 can be mounted onto the platform 106 by placing the tray assembly 100 such that the platform 106 is held between the bottom surface of the tray 104 and a top surface of the supporting element 110. Further, the spacing element 116 and the pivot point provided by the hinge help to make the tray assembly 100 adaptable to different platform thicknesses and to hold the supporting element 110 in place against the platform 106.

In one example, as shown in the FIGS. 1a-1c, the spacing element 116 can be a threaded cavity or nut in the extension portion 114 having a screw 118. The screw 118 can be tightened against the tray 104 to adjust the clamping width, i.e., a distance between the supporting element 110 and the tray 104 in this implementation. As depicted in FIG. 1b, as the screw 118 is tightened, the first connector element 112a pivots against the second connector element 112b in an anti-clockwise direction and thereby increases the distance between the tray 104 and the supporting element 110. Conversely, as the screw 118 is loosened, the first connector element 112a pivots against the second connector element 112b in a clockwise direction and thereby decreases the distance between the tray 104 and the supporting element 110. Thus, the screw 118 and the spacing element 116 can be used to clamp the platform 106 between the tray 104 and the supporting element 110 irrespective of the thickness of the platform 106 and can hold the tray 104 in position while in use.

For dismounting the tray assembly 100 from the platform 106, the spacing element 116 and the screw 118 can be suitably used, as will be appreciated, to increase the distance between the supporting element 110 and the tray 104 and to unclamp the tray assembly 100 from the platform 106.

Further, the tray assembly 100 can itself be easily disassembled into the clamp 102 and the tray 104 for storage while not in use. For this, the first connector element 112a and the second connector element 112b can be decoupled by removing the protruding pin from the partially open cavity. Thus, the tray 104 and the clamp 102 can be easily decoupled and stored in a compact manner and can also be transported easily from one place to another.

In order to facilitate locking between the first connector element 112a and the second connector 112b while in use, a breadth of the recess can be made smaller than a diameter of the protruding pin. Further, the elongated cavity may be formed using various retractable locking configurations as described with reference to FIGS. 2a to 2c.

Figure 2A:
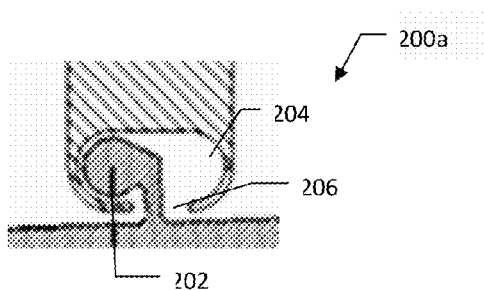
FIGS. 2a, 2b and 2c schematically illustrate locking configurations for connecting a clamp with a tray, in accordance with one embodiment of the present subject matter.

FIG. 2a illustrates an exploded view of a pivotable hinge joint 200a in accordance with one embodiment of the present subject matter. As mentioned earlier, the pivotable hinge joint can be formed by coupling the first connector element 112a and the second connector element 112b. One of the first and second connector elements 112a, 112b include a protruding pin 202, also referred to as pin 202, while the other includes a partially open cavity 204 accessible through a recess 206. The pin 202 can be inserted into the cavity 204 through the recess 206 and can be locked by way of various retractable locking configurations. In one implementation, edges of the cavity 204 may be made from an elastic material to allow the pin 202 to be inserted into and removed from the cavity 204.

Figure 2B:
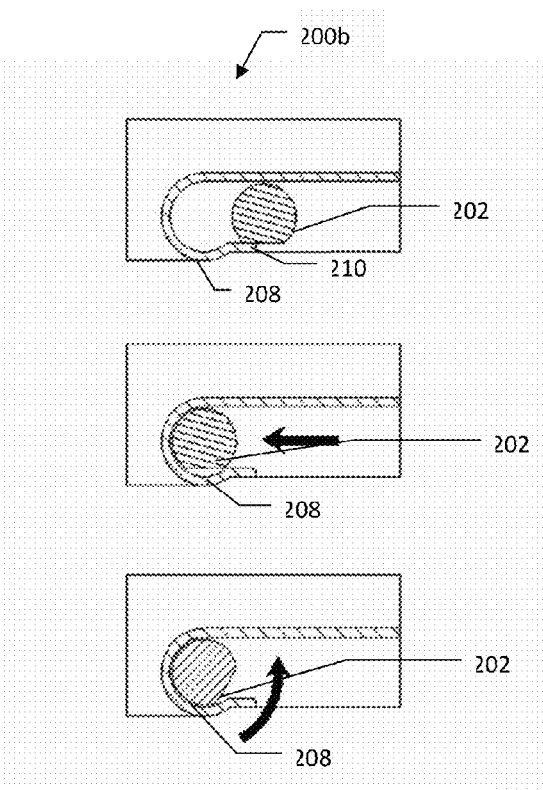

FIG. 2b illustrates a retractable lock configuration 200b for a pivotable hinge joint in accordance with one embodiment of the present subject matter. A pin 202, in one of the connector elements 112a, 112b, can be formed having a cross-section of a partial circle with a flat edge. Further, a crumple zone 208 can be provided in the partially open cavity. To insert the pin 202 into the cavity, the flat edge of the pin 202 can be placed parallel to an open edge 210 of the partially open cavity and the pin 202 can be pushed into the crumple zone 208. Further, the pin 202 can be rotated so that the flat edge is no longer parallel to the open edge 210, thereby locking the pin 202 in place. To retract the pin 202, the pin 202 can be rotated so that the flat edge of the pin becomes parallel to the open edge 210 and can be then retracted easily.

Figure 2C:
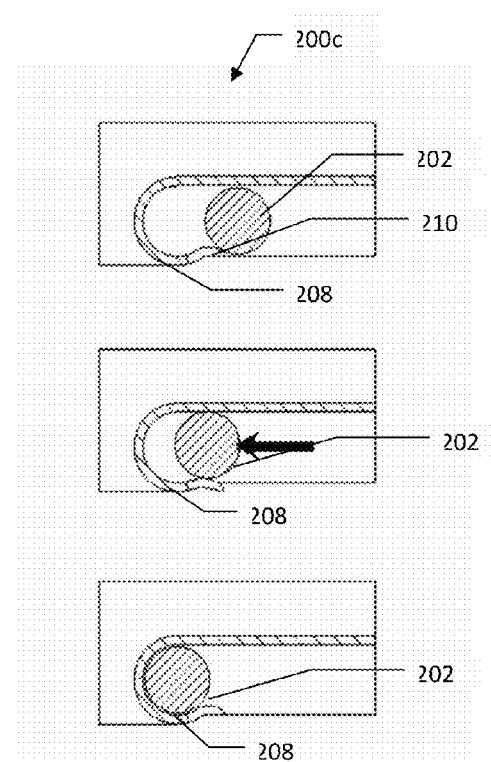

FIG. 2c illustrates a retractable lock configuration 200c for a pivotable hinge joint in accordance with another embodiment of the present subject matter. As shown in the FIG. 2c, the pin 202, in one of the connector elements 112a, 112b, can be formed having a cross-section of a full circle. Further, the crumple zone 208 can be provided in the partially open cavity. Also, the diameter of the recess can be made smaller than the diameter of the pin 202. The connector element forming the cavity can be made of an elastic material so that once the pin 202 is inserted into the crumple zone 208 through the open edge 210, the pin 202 is held in place due to the elasticity of the material.

Figure 3:
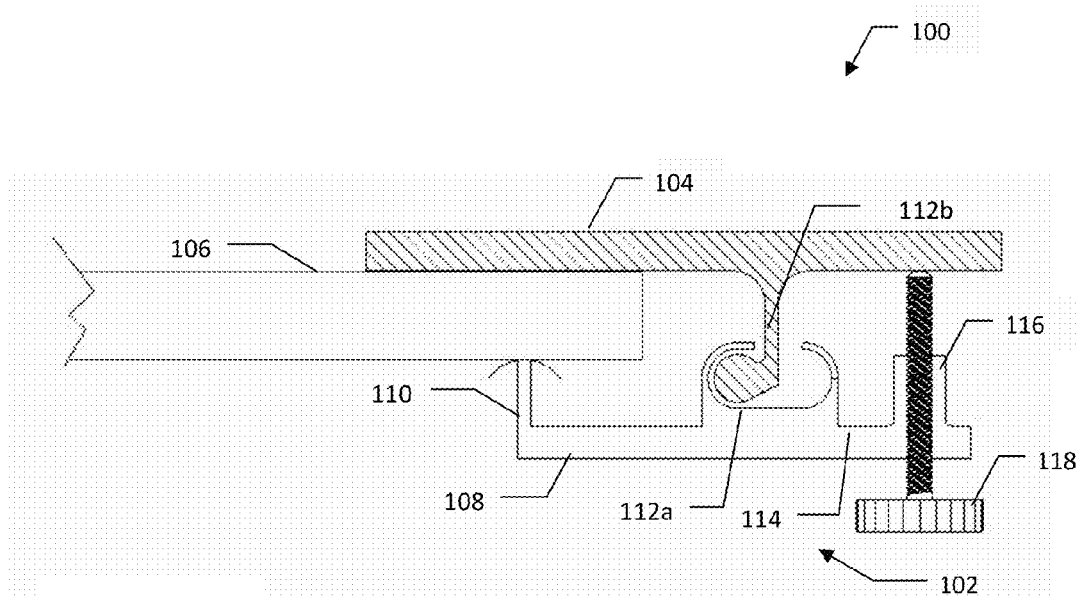
FIG. 3 schematically illustrates a tray assembly, in accordance with another embodiment of the present subject matter.

FIG. 3 schematically illustrates a tray assembly 100, in accordance with another embodiment of the present subject matter. As shown in the FIG. 3, the first connector element 112a on the clamp 102 may be a partially open elongated cavity, such as the cavity 204, and the second connector element 112b on the tray 104 may be a protruding pin, such as the pin 202, that can be inserted into the partially open elongated cavity to form the hinge. The assembly and disassembly of the tray assembly and mounting of the tray assembly onto the platform 106 can be carried out in a manner similar to that discussed above with respect to the tray assembly 100, as will be easily understood by a person skilled in the art.

Figure 4:
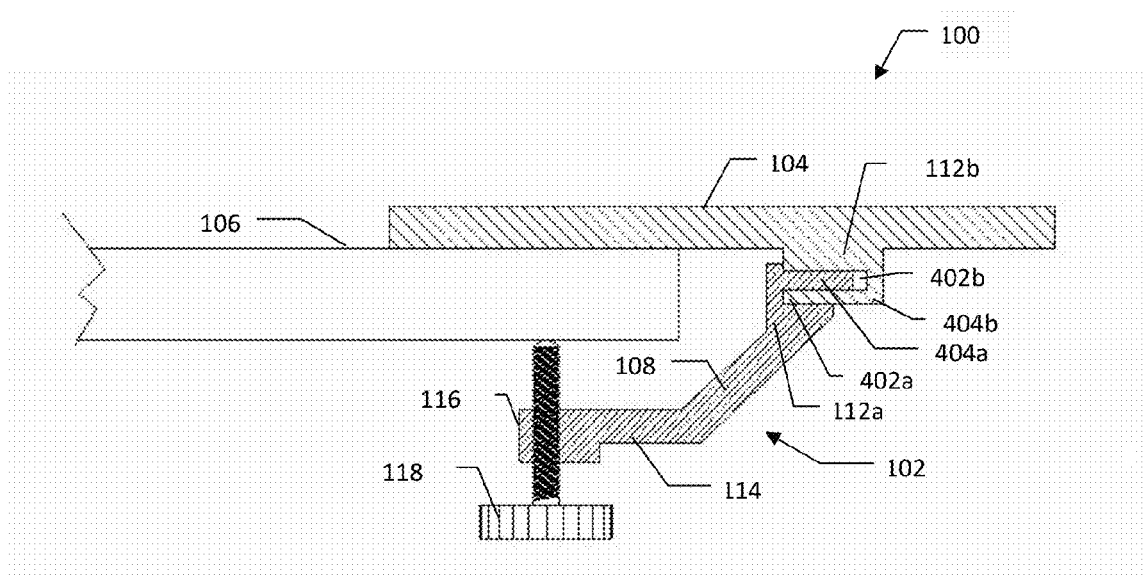
FIG. 4 schematically illustrates a tray assembly, according to yet another embodiment of the present subject matter.

FIG. 4 schematically illustrates a tray assembly 100, according to yet another embodiment of the present subject matter. As shown in the FIG. 4, the clamp 102 in this embodiment does not include a supporting element 110. The clamp 102 includes a base portion 108, a first connector element 112a at one end of the base portion 108 and an extension portion 114 connected to the base portion 108. The extension portion 114 includes the spacing element 116, which can be, for example, a threaded cavity with a screw 118, to adjust the clamping width. Here, the spacing element 116 is itself used to brace the tray 104 against the platform 106. Thus, the clamping width in this implementation is the distance between the screw 118 and the tray 104.

Further, in this example, the first connector element 112a and the second connector element 112b form a sliding joint. For this, at least one of the first connector element 112a and the second connector element 112b comprises a groove 402 and the other comprises a ridge 404 that is slidable into the groove 402. In order to disassemble the tray assembly 100, the ridge 404 can be simply slided out of the groove 402. In one of the embodiments, as shown in FIG. 4, both the connector elements 112a, 112b can include grooves 402a, 402b and corresponding ridges 404a, 404b to form the sliding joint.

Figure 5A:
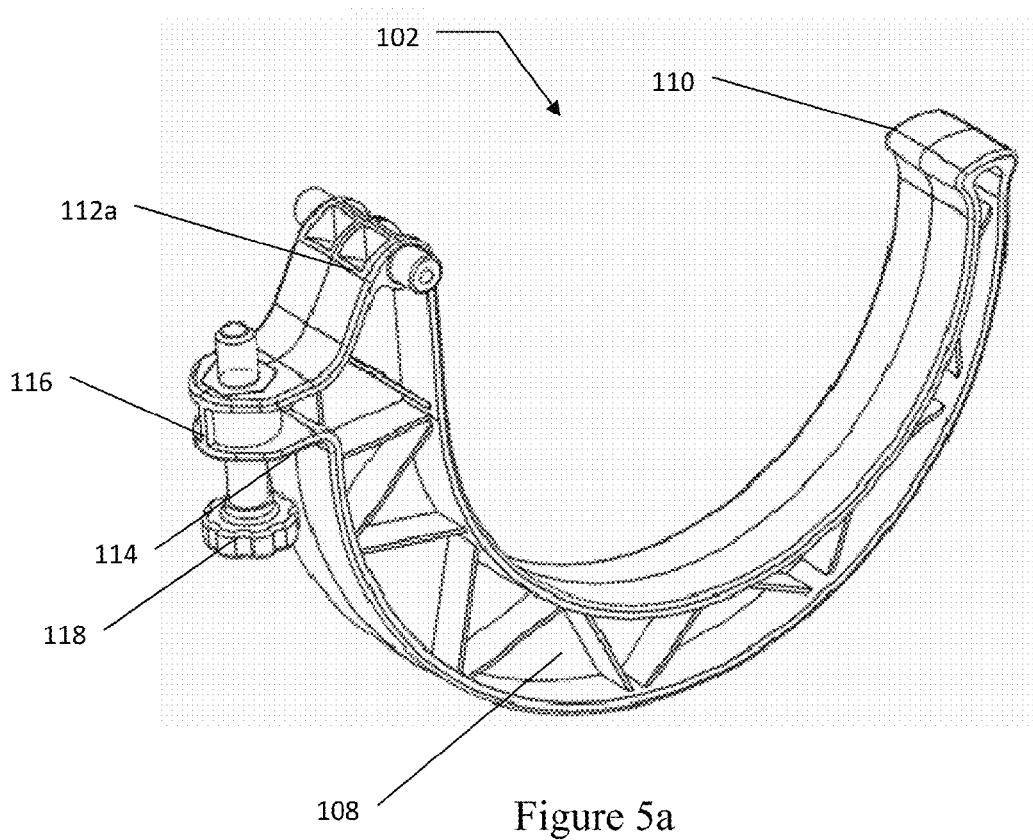
FIGS. 5a, 5b, and 5c illustrate the clamp and the tray assembly at various stages of assembling and mounting, in accordance with one embodiment of the present subject matter.
Figure 5B:
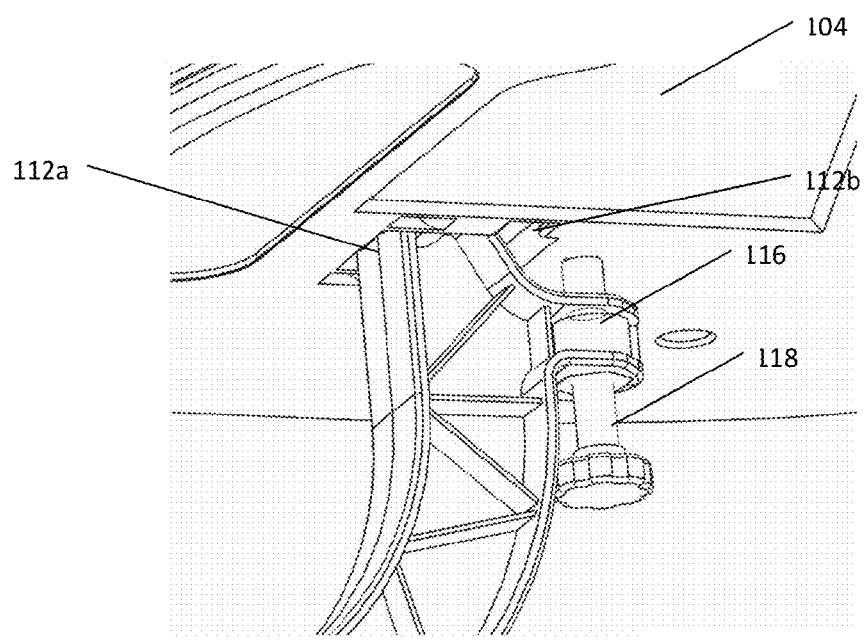
Figure 5C:
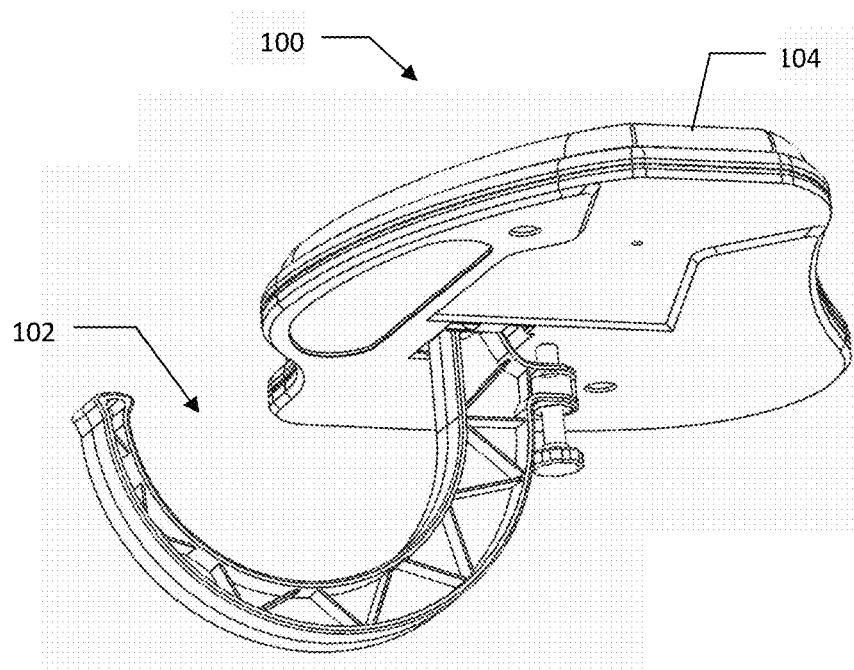

FIGS. 5a, 5b, and 5c illustrate the clamp 102 and the tray assembly 100 at various stages of assembling and mounting, in accordance with one embodiment of the present subject matter. As shown, in one implementation, the base portion 108 can be substantially U-shaped with the supporting element 110 formed on one end of the U-shape, the connector element 112a formed on other end of the U-shape, and the extension portion 114 disposed adjacent to the connector element 112a. The extension portion 114 can include the spacing element 116, such as a screw 118 that passes through a threaded cavity or a nut.

As shown in FIGS. 5b and 5c, the connector element 112a of the clamp 102 can be connected to the corresponding connector element 112b of the tray 104 to form a detachable joint, such as a hinge. Further, a pair of tray assemblies 100, each formed by connecting a tray 104 and a clamp 102, can be mounted onto a platform 106, such as a table, and can be used as arm rests to provide an ergonomic working environment, for example, while working on a laptop. It will be appreciated that similar arm rests can be formed using the tray assemblies 100 and 100 described earlier.

In accordance with one embodiment of the present subject matter, two tray assemblies can be connected together. In one implementation, to provide additional stability to the pair of arm rests while in use, the arm rests may be linked using a sliding link. The sliding link can be an elongate member. At both ends of the elongate member an opening can be disposed. Each opening can be used to couple the elongate member with one of the pair of arm rests or tray assemblies, thus fixing the distance between the arm rests and providing additional stability during use.

Although embodiments of clamp for mounting of tray and tray assembly thereof have been described in a language specific to structural features and/or methods, it is to be understood that the invention is not necessarily limited to the specific features or methods described. Rather, the specific features and methods are disclosed as exemplary embodiments for the clamp and tray assembly. Further, while example uses and advantages of the clamp and tray assembly have been provided in the description, it will be understood that the invention is not limited to the specific uses and advantages and can have various other applications as well.

The invention claimed is:

1. A clamp for mounting a tray on a platform, the clamp comprising:
    a base portion;
    a connector element coupled to the base portion, the connector element being adapted to form a detachable joint with the tray; and
    an extension portion coupled to the base portion, the extension portion having a spacing element for adjusting a clamping width based on at least on a thickness of the platform, wherein the clamping width is a distance between the tray and an element of the clamp, and wherein the clamp is to brace the tray against the platform.

2. The clamp as claimed in claim 1, wherein the detachable joint is one of a pivotable hinge joint, a sliding joint, and a groove based-joint.

3. The clamp as claimed in claim 1, wherein the clamping width is a distance between the spacing element and the tray.

4. The clamp as claimed in claim 1, wherein the clamp further comprises a supporting element coupled to the base portion to clamp the tray with the platform, and wherein the clamping width is a distance between the supporting element and the tray.

5. The clamp as claimed in claim 1, wherein the base portion is substantially U-shaped with the supporting element formed on one end of the U-shape, the connector element formed on other end of the U-shape, and the extension portion disposed adjacent to the connector element.

6. A tray assembly for mounting on a platform, the tray assembly comprising:
- a clamp for mounting a tray on the platform, the clamp comprising:
  - a base portion;
  - an extension portion coupled to the base portion, the extension portion having a spacing element for adjusting a clamping width based at least on a thickness of the platform, wherein the clamping width is a distance between the tray and an element of the clamp, and wherein the clamp is to brace the tray against the platform; and
  - a first connector element coupled to the base portion, the first connector element being adapted to form a detachable joint with the tray; and
- the tray having a second connector element to form the detachable joint.

7. The tray assembly as claimed in claim 6, wherein the detachable joint is one of a pivotable hinge joint, a sliding joint, and a groove based joint.

8. The tray assembly as claimed in claim 6, wherein at least one of the first connector element and the second connector element comprises a groove and other comprises a ridge slidable into the groove, and wherein the clamping width is a distance between the spacing element and the tray.

9. The tray assembly as claimed in claim 6, wherein the clamp further comprises a supporting element coupled to the base portion to clamp the tray with the platform, and wherein the clamping width is a distance between the supporting element and tray.

10. The tray assembly as claimed in claim 9, wherein the base portion is substantially U-shaped with the supporting element formed on one end of the U-shape, the first connector element formed on other end of the U-shape, and the extension portion disposed adjacent to the first connector element.

11. The tray assembly as claimed in claim 9, wherein
- the first connector element comprises a partially open elongated cavity accessible through a recess on a surface of the first connector element; and
- the second connector element is a protruding pin that is adapted to be inserted into the elongated cavity through the recess to form a pivotable hinge.

12. The tray assembly as claimed in claim 11, wherein the protruding pin is removable from the elongated cavity through the recess to detach the clamp from the tray.

13. The tray assembly as claimed in claim 11, wherein the partially open elongated cavity includes a crumple zone to hold the protruding pin in place during use.

14. The tray assembly as claimed in claim 11, wherein a breadth of the recess is smaller than a diameter of the protruding pin.

15. The tray assembly as claimed in claim 9, wherein
- the second connector element comprises a partially open elongated cavity accessible through a recess on a surface of the second connector element; and
- the first connector element is a protruding pin is removable from the elongated cavity through the recess to form a pivotable hinge.

* * * * *